(12) United States Patent
Kunisada et al.

(10) Patent No.: US 6,592,996 B1
(45) Date of Patent: Jul. 15, 2003

(54) SOLAR-SHADING LIGHT-TRANSMISSIVE PANEL AND SOLAR-SHADING MULTI-LAYER LIGHT-TRANSMISSIVE PANEL USING SAME

(75) Inventors: Terufusa Kunisada, Osaka (JP); Daisuke Arai, Osaka (JP); Etsuo Ogino, Osaka (JP)

(73) Assignee: Nippon Sheet Glass Co., Ltd. (JP)

( * ) Notice: Subject to any disclaimer, the term of this patent is extended or adjusted under 35 U.S.C. 154(b) by 0 days.

(21) Appl. No.: 09/548,982

(22) Filed: Apr. 14, 2000

Related U.S. Application Data (63) Continuation-in-part of application No. 09/240,451, filed on Jan. 29, 1999.

(30) Foreign Application Priority Data

| Feb. 6, 1998 | (JP) | ............................................. 10-41071 |
| Apr. 15, 1999 | (JP) | ........................................... 11-108065 |

(51) Int. Cl.⁷ .......................... B32B 17/06; B32B 15/04
(52) U.S. Cl. ........................ 428/432; 428/428; 428/469; 428/472; 428/698; 428/699; 428/702
(58) Field of Search ................................. 428/432, 428, 428/216, 433, 434, 469, 472, 699, 701, 702, 913, 698; 359/360, 585, 589

(56) References Cited

U.S. PATENT DOCUMENTS

| 3,868,805 A | * | 3/1975 | Battersby ..................... 428/120 |
| 4,450,201 A | | 5/1984 | Brill et al. ................... 428/336 |
| 4,806,220 A | | 2/1989 | Finley ..................... 204/192.27 |
| 5,399,435 A | | 3/1995 | Ando et al. .................. 428/428 |
| 5,407,733 A | | 4/1995 | Bjornard et al. ............. 428/216 |
| 5,411,794 A | | 5/1995 | Kawaguchi et al. ......... 428/216 |
| 5,595,825 A | | 1/1997 | Guiselin ..................... 428/428 |
| 5,935,702 A | * | 8/1999 | Macquart et al. ........... 359/359 |
| 5,962,115 A | * | 10/1999 | Zmelty et al. .............. 428/216 |
| 5,965,246 A | | 10/1999 | Guiselin et al. ............. 428/212 |

FOREIGN PATENT DOCUMENTS

| DE | 4422830 | 1/1995 | ............. E06B/9/24 |
| EP | 0560534 | 9/1993 | ............. G02B/5/28 |
| EP | 0636587 | 2/1995 | ........... C03C/17/00 |
| EP | 0638528 | 2/1995 | ........... C03C/17/36 |
| EP | 01718250 | 6/1996 | ........... C03C/17/36 |
| EP | 0747330 | 12/1996 | ........... C03C/17/36 |
| EP | 0 796 825 A2 | 9/1997 | ........... C03C/17/36 |
| EP | 0 847 965 A1 | 6/1998 | ........... C03C/17/36 |
| EP | 0 934 913 A1 | 8/1999 | ........... C03C/17/36 |
| GB | 2279365 | 1/1995 | ........... C03C/17/36 |
| JP | 7-165442 | 6/1995 | ........... C03C/17/34 |
| JP | 8-238710 | 9/1996 | ............. B32B/7/02 |
| JP | 8-336928 | 12/1996 | ............. B32B/9/00 |

* cited by examiner

*Primary Examiner*—Deborah Jones
*Assistant Examiner*—Andrew T Piziali
(74) *Attorney, Agent, or Firm*—Schwegman, Lundberg, Woessner & Kluth, P.A.

(57) ABSTRACT

A solar-shading light-transmissive panel has a light-transmissive sheet, an absorbing layer disposed on said light-transmissive sheet, a first transparent dielectric layer disposed on said absorbing layer, an Ag-rich layer comprising Ag as a main component disposed on said first transparent dielectric layer, and a second transparent dielectric layer disposed on said Ag-rich layer. The solar-shading light-transmissive panel, which basically has the four layers and can be manufactured relatively inexpensively, has an ornamentally excellent appearance, a relatively high solar-shading capability, and a relatively high visible light transmittance.

7 Claims, 5 Drawing Sheets

SOLAR-SHADING LIGHT-TRANSMISSIVE PANEL AND SOLAR-SHADING MULTI-LAYER LIGHT-TRANSMISSIVE PANEL USING SAME

This application is a Continuation-In-Part of U.S. Ser. No. 09/240,451, filed Jan. 29, 1999, which claimed priority to Japanese Patent Application No. 10-41071, filed Feb. 6, 1998. This application also claims priority to Japanese Patent Application No. 11-108065, filed Apr. 15, 1999.

BACKGROUND OF THE INVENTION

1. Field of the Invention

The present invention relates to a solar-shading light-transmissive panel with a multi-layer film including an Ag-rich layer comprising Ag as a main component, and a solar-shading multi-layer light-transmissive panel which employs such a solar-shading light-transmissive panel.

2. Description of the Related Art

In recent years, multi-layer window glass panes have been in widespread use to meet demands for highly hermetic, heat-insulated residential houses. For the purposes of increasing heat-insulating and solar-shading capabilities, there have also been widely used multi-layer glass panels with a multi-layer film including an Ag-rich layer comprising Ag as a main component. If a multi-layer glass panel with a multi-layer film including an Ag-rich layer is used as a window glass pane, then the window with such a window glass pane has increased heat-insulating and solar-shading capabilities. The heat-insulating capability is effective to cut down on the cost of heating the room in winter, and the solar-shading capability makes it possible to reduce the cost of air-conditioning the room in summer.

Figure 1:
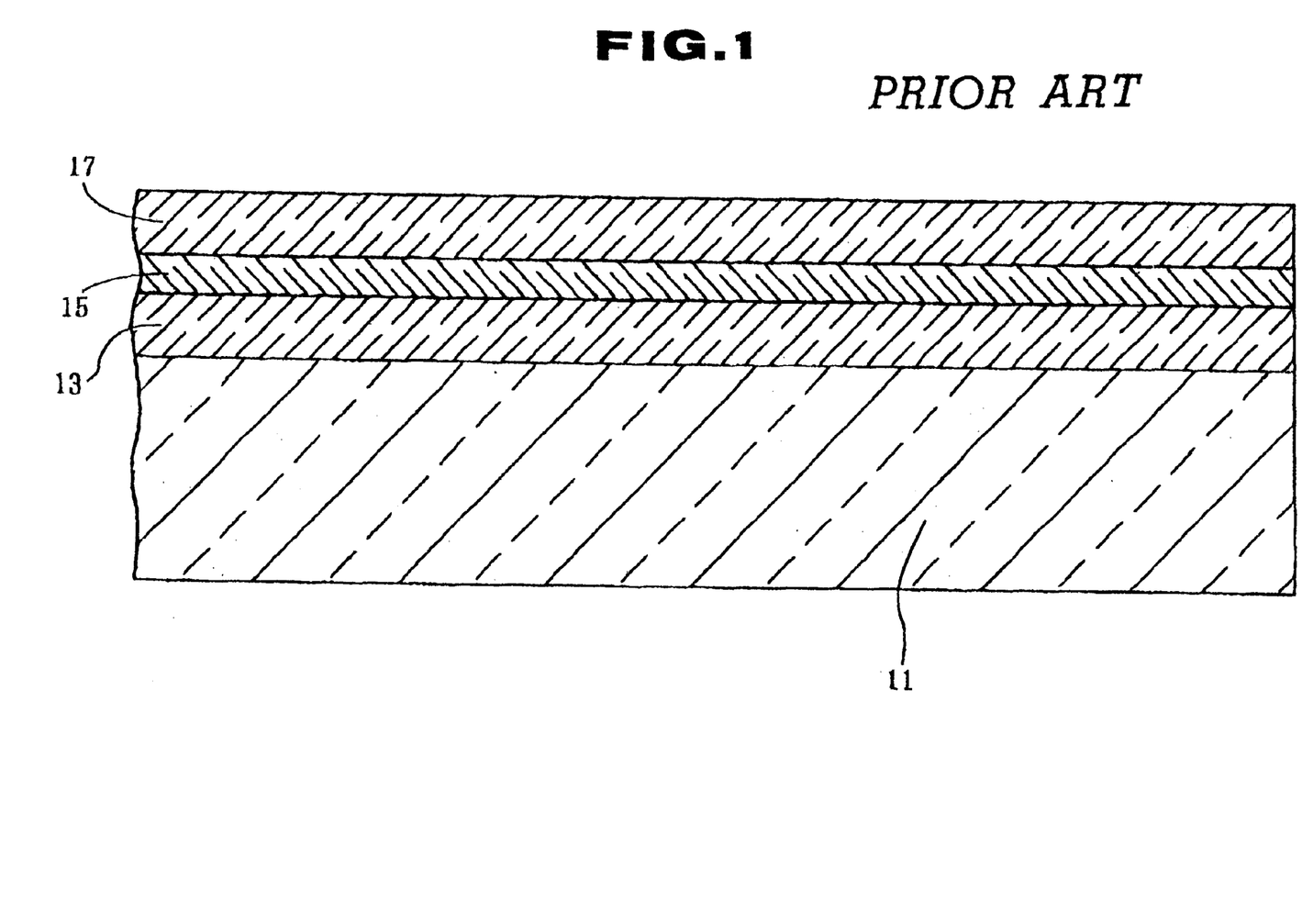
FIG. 1 is a fragmentary transverse cross-sectional view of a conventional glass panel with the single-Ag LowE.

One conventional glass panel with a multi-layer film including an Ag-rich layer is disclosed in Japanese patent publication No. 7-15143, for example. As shown in FIG. 1 of the accompanying drawings, the disclosed glass panel comprises a transparent glass sheet 11, a first transparent dielectric layer 13, an Ag-rich layer 15, and a second transparent dielectric layer 17. The three layers 13, 15 and 17 are disposed successively on the sheet 11. The three layers 13, 15, 17 jointly make up a multi-layer film which will be referred to as "single-Ag LowE".

Figure 2:
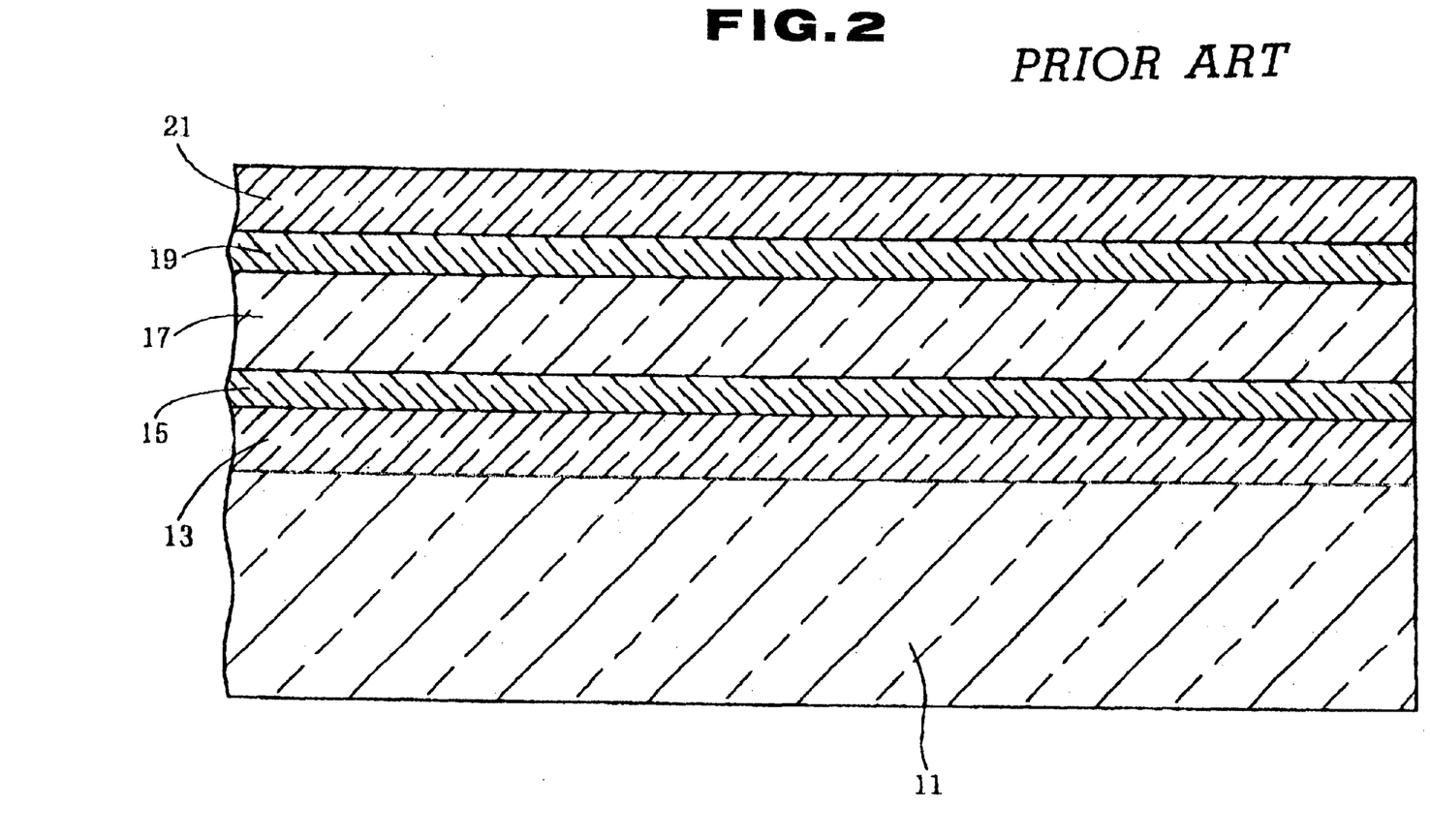
FIG. 2 is a fragmentary transverse cross-sectional view of a conventional glass panel with the double-Ag LowE.

Another conventional glass panel with a multilayer film including an Ag-rich layer is disclosed in Japanese laid-open patent publication No. 7-165442. As shown in FIG. 2 of the accompanying drawings, the disclosed glass panel comprises a transparent glass sheet 11, a first transparent dielectric layer 13, a first Ag-rich film 15, a second transparent dielectric layer 17, a second Ag-rich layer 19, and a third transparent dielectric layer 21. The five layers 13, 15, 17, 19 and 21 are disposed successively on the glass sheet 11. The five layers 13, 15, 17, 19, 21 jointly make up a multi-layer film which will be referred to as "double-Ag LowE".

Figure 3:
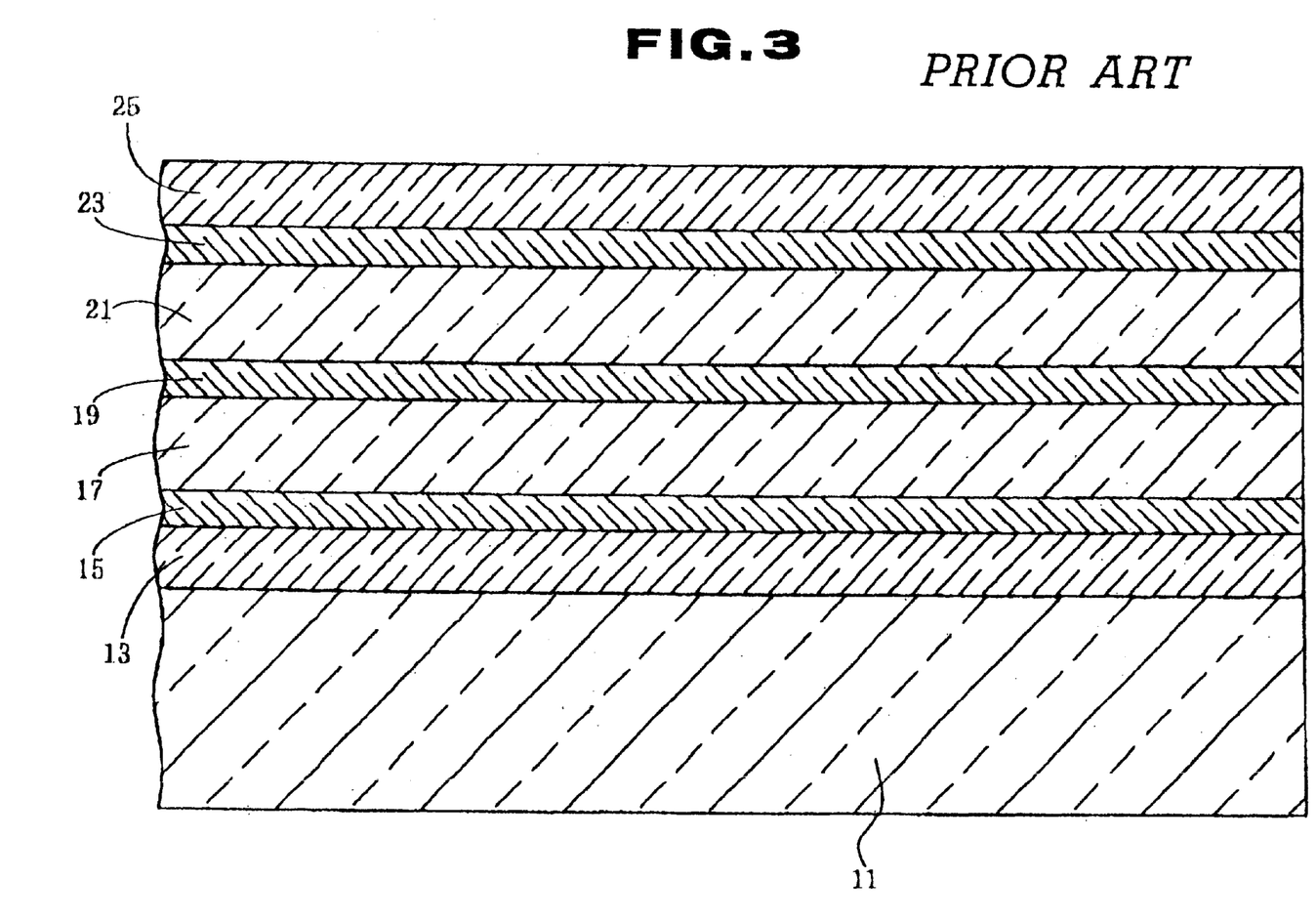
FIG. 3 is a fragmentary transverse cross-sectional view of a conventional glass panel with the triple-Ag LowE.

Japanese laid-open patent publication No. 7-149545 discloses still another conventional glass panel with a multi-layer film including an Ag-rich layer. AS shown in FIG. 3 of the accompanying drawings, the disclosed glass panel comprises a transparent glass sheet 11, a first transparent dielectric layer 13, a first Ag-rich layer 15, a second transparent dielectric layer 17, a second Ag-rich layer 19, a third transparent dielectric layer 21, a third Ag-rich layer 23, and a fourth transparent dielectric layer 25. The seven layers 13, 15, 17, 19, 21, 23 and 25 are disposed successively on the transparent glass sheet 11. The seven layers 13, 15, 17, 19, 21, 23, 25 jointly make up a multi-layer film which will be referred to as "triple-Ag LowE".

A comparison of the double-Ag LowE and the single-Ag LowE which have the same visible light transmittance indicates that the double-Ag LowE has a better solar-shading capability. Therefore, a multi-layer glass panel with the double-Ag LowE, which is used as a window glass pane, is more effective to suppress an indoor temperature rise due to solar radiation than, but introduces as much indoor light during daytime as, a multi-layer glass panel with the single-Ag LowE, which is used as a window glass pane.

A comparison of the triple-Ag LowE and the double-Ag LowE which have the same visible light transmittance reveals that the triple-Ag LowE has a better solar-shading capability. Therefore, a multi-layer glass panel with the triple-Ag LowE, which is used as a window glass pane, is more effective to suppress an indoor temperature rise due to solar radiation and hence to reduce an air-conditioning load than a multi-layer glass panel with the Double-Ag LowE, which is used as a window glass pane, while keeping a desired level of indoor light during daytime.

However, the double-Ag LowE is more costly than the single-Ag LowE to produce the films because the double-Ag LowE has more layers than the single-Ag LowE. Similarly, the triple-Ag LowE is more costly than the double-Ag LowE to produce the films because the triple-Ag LowE has more layers than the double-Ag LowE.

Office buildings find it most desirable to reduce an air-conditioning load from an energy saving viewpoint. For reducing the air-conditioning load on office buildings, solar-reflecting glass panels comprising one or more layers of metal oxide, metal, or metal nitride disposed on a transparent glass sheet are widely used as window glass panes for such office buildings. The conventional solar-reflecting glass panels are highly effective in reducing the air-conditioning load because they have as high a solar-shading ability as the triple-Ag LowE.

The solar-shading capabilities of glass panels with the single-Ag LowE and the double-Ag LowE are lower than the solar-shading capability of the conventional solar-reflecting glass panels. For this reason, indoor temperature increases due to solar radiation through office building window glass panes which comprise multilayer glass panels with the single-Ag LowE and the double-Ag LowE are greater than those through office building window glass panes which comprise conventional solar-reflecting glass panels. Consequently, it is preferable to use solar-reflecting glass panels as window glass =panes in terms of the solar-shading capability.

However, the visible light transmittance of solar-reflecting glass panels is much smaller than the visible light transmittance of the glass panels with the single-Ag LowE, the double-Ag LowE, or the triple-Ag LowE. If solar-reflecting glass panels are used as window glass panes, therefore, the rooms with those window glass panes are relatively dark during daytime, and the window glass panes give an unnatural impression to occupants in the rooms.

There has been known a solar-reflecting glass panel whose visible light transmittance has been increased by reducing the thickness of a metal or metal oxide film thereof for solving the above problem. However, the solar-reflecting glass panel with its visible light transmittance thus increased naturally has a reduced solar-shading capability. The solar-shading capability of a glass panel with the triple-Ag LowE is substantially the same as the solar-shading capability of a conventional solar-reflecting glass panel. However, such glass panel with the triple-Ag LowE is highly expensive to manufacture because the triple-Ag LowE is made up of seven layers.

SUMMARY OF THE INVENTION

It is therefore an object of the present invention to provide a solar-shading glass panel having a higher visible light transmittance than that of a conventional solar-reflecting glass panel and a solar-shading capability substantially equivalent to that of a glass panel with the double-Ag LowE or a conventional solar-reflecting glass panel.

Another object of the present invention is to provide a solar-shading glass panel which basically has four layers and hence can be manufactured relatively inexpensively.

According to the present invention, a solar-shading light-transmissive panel has a light-transmissive sheet, an absorbing layer disposed on said light-transmissive sheet, a first transparent dielectric layer disposed on said absorbing layer, an Ag-rich layer comprising Ag as a main component disposed on said first transparent dielectric layer, and a second transparent dielectric film disposed on said Ag-rich layer.

The light-transmissive sheet may be a glass sheet which is transparent or semitransparent in at least a visible light range or a synthetic resin sheet which is transparent or semitransparent in at least a visible light range. The glass sheet may be made of float glass, soda lime glass, borosilicate glass, crystallized glass, or the like. The synthetic resin sheet may be made of PET (polyethylene terephthalate), PVB (polyvinyl butyral), EVA (ethylvinyl acetate), cellulosic resin, or the like. Generally, the light-transmissive sheet has a thickness ranging from 1 to 15 mm, preferably from 2 to 10 mm.

The absorbing layer is capable of absorbing solar radiation rays to a certain extent. The absorbing layer has a visible light transmittance preferably in the range from 45 to 80%, and more preferably in the range from 50 to 75%. The absorbing layer may comprise a film of metal nitride having a thickness ranging from 1 to 20 nm, preferably from 2 to 15 nm, or a film of metal (metal or alloy) having a thickness ranging from 0.2 to 4 nm, preferably from 0.3 to 3.5 nm. The metal nitride may comprise at least one material selected from the group consisting of titanium nitride, zirconium nitride, tantalum nitride, and chromium nitride. If the absorbing layer is made of metal nitride, then the reflected color of an uncoated surface of the solar-shading light-transmissive panel has highly excellent repetitive reproducibility, and the reflected colors of both uncoated and coated surfaces of the solar-shading light-transmissive panel may easily be adjusted to natural colors. The metal may comprise at least one material selected from the group consisting of chromium, an alloy comprising mainly nickel and chromium, stainless steel, an alloy comprising mainly stainless steel, zinc, niobium, titanium, tantalum, zirconium, and tungsten.

Each of the first transparent dielectric layer, i.e., the first transparent dielectric layer, and the second transparent dielectric layer may comprise a single-layer made of at least one material selected from the group consisting of silicon nitride, titanium oxide, tin oxide, zinc oxide, zinc oxide doped with Al, and tin oxide doped with at least one of Sb and F, or multiple sub-layers comprising a plurality of layers each made of at least one material selected from the above group. These layers may be made of materials different from each other or some of these layers may be made of one material.

The Ag-rich layer may be made of Ag alone, or may be made of Ag to which there is added preferably 0.1 to 5%, more preferably 0.1 to 4%, of at least one material selected from the group consisting of Pd, Au, In, An, and Sn. The thickness of the Ag-rich layer is preferably in the range from 5 to 20 nm, and more preferably in the range from 7 to 17 nm.

A protective layer made of titanium oxide, silicon nitride, or the like and having a thickness ranging preferably from 5 to 30 nm, more preferably from 10 to 20 nm may be disposed on a surface of the second transparent dielectric film remote from the Ag-rich layer.

The solar-shading light-transmissive panel may also have an additional layer disposed on one or both surfaces of the Ag-rich layer, the additional layer being made of at least one material selected from the group consisting of titanium, chromium, an alloy comprising mainly nickel and chromium, stainless steel, an alloy comprising mainly stainless steel, zinc, niobium, tantalum, zirconium, and tungsten. The additional layer is effective to increase the heat resistance of the Ag-rich film, and also to prevent the Ag-rich layer from being oxidized when a transparent dielectric layer is formed on the Ag-rich layer in an atmosphere containing oxygen. Therefore, the Ag-rich layer is effectively prevented from being peeled off due to corrosion by the additional layer. The thickness of the additional layer is preferably in the range from 1 to 5 nm, and more preferably in the range from 1.2 to 4 nm.

The solar-shading light-transmissive panel has a visible light transmittance ranging preferably from 50 to 75%, and more preferably from 60 to 75%, and a solar transmittance ranging preferably from 20 to 45%, and more preferably from 20 to 40%. In order for the color of reflected light or transmitted light to look as natural as possible, the first transparent dielectric layer has a thickness ranging from 5 to 90 nm, preferably from 10 to 70 nm, and the second transparent dielectric layer has a thickness ranging from 10 to 90 nm, preferably from 15 to 70 nm.

According to the present invention, there is also provided a solar-shading double-layer light-transmissive panel, comprising the above solar-shading light-transmissive panel and at least one second light-transmissive sheet disposed in confronting relationship to the solar-shading light-transmissive panel, the solar-shading light-transmissive panel and the at least one second light-transmissive sheet being fixed relatively to each other such that the absorbing layer, the first transparent dielectric layer, the Ag-rich layer, and the second transparent dielectric layer are interposed between the light-transmissive sheet of the solar-shading light-transmissive panel and the at least one second light-transmissive sheet. The second light-transmissive sheet may be of the same material and thickness as those of the light-transmissive sheet of the above solar-shading light-transmissive panel. A second multi-layer film, which is the same as that of the light-transmissive sheet of the above solar-shading light-transmissive panel, may be disposed on the second light-transmissive sheet. The second multi-layer film should preferably be disposed between the second light-transmissive sheet on which the second multi-layer film is formed, and the light-transmissive sheet of the above solar-shading light-transmissive panel or another second light-transmissive sheet.

The above and other objects, features, and advantages of the present invention will become apparent from the following description when taken in conjunction with the accompanying drawings which illustrate preferred embodiments of the resent invention by way of example.

DETAILED DESCRIPTION OF THE PREFERRED EMBODIMENTS

Figure 4:
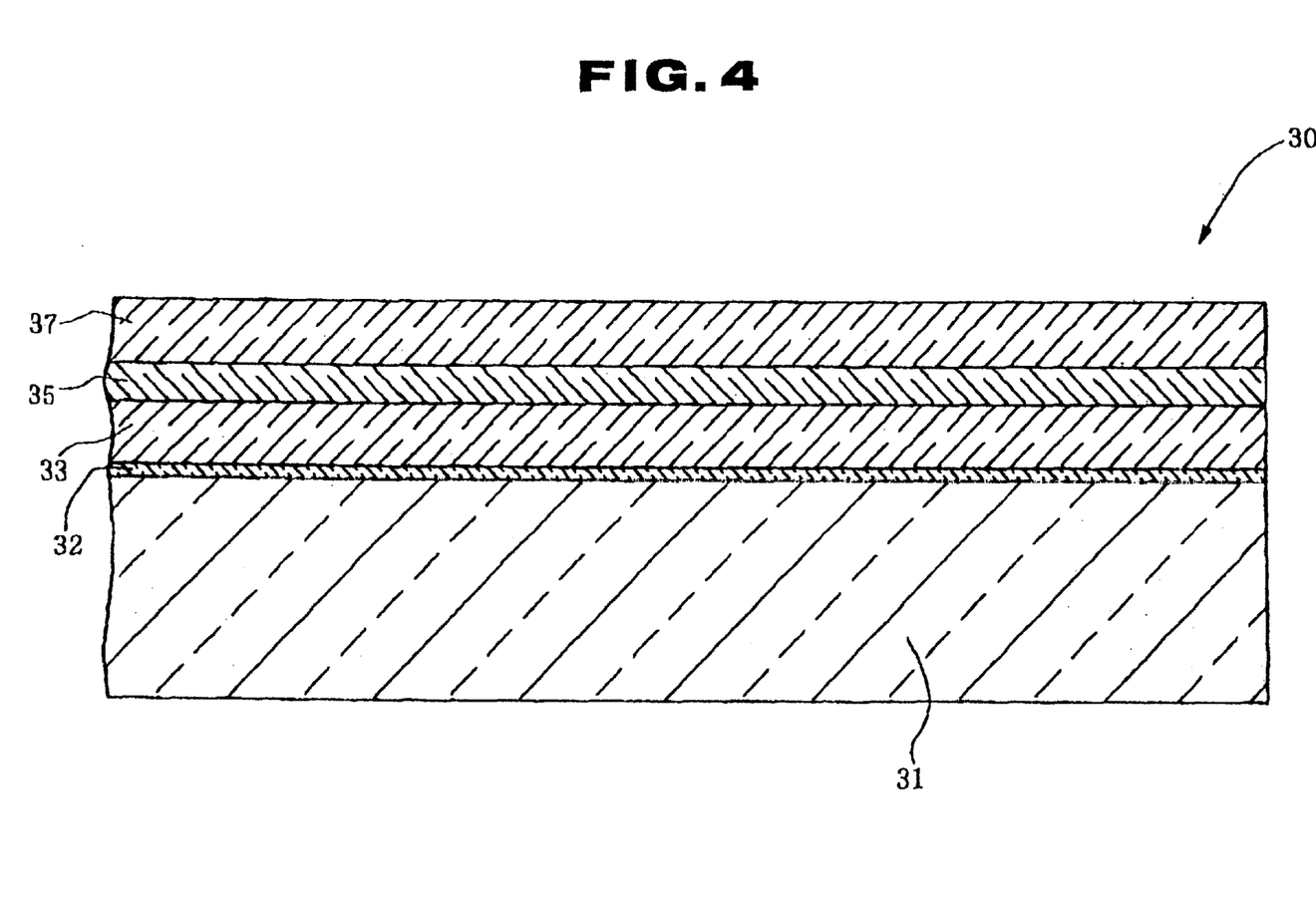
FIG. 4 is a fragmentary transverse cross-sectional view of a solar-shading glass panel according to the present invention.

As shown in FIG. 4, a solar-shading glass panel 30 according to the present invention comprises an absorbing layer 32, a first transparent dielectric layer 33, an Ag-rich layer 35, and a second transparent dielectric layer 37 which are disposed successively on a transparent glass sheet 31.

Figure 5:
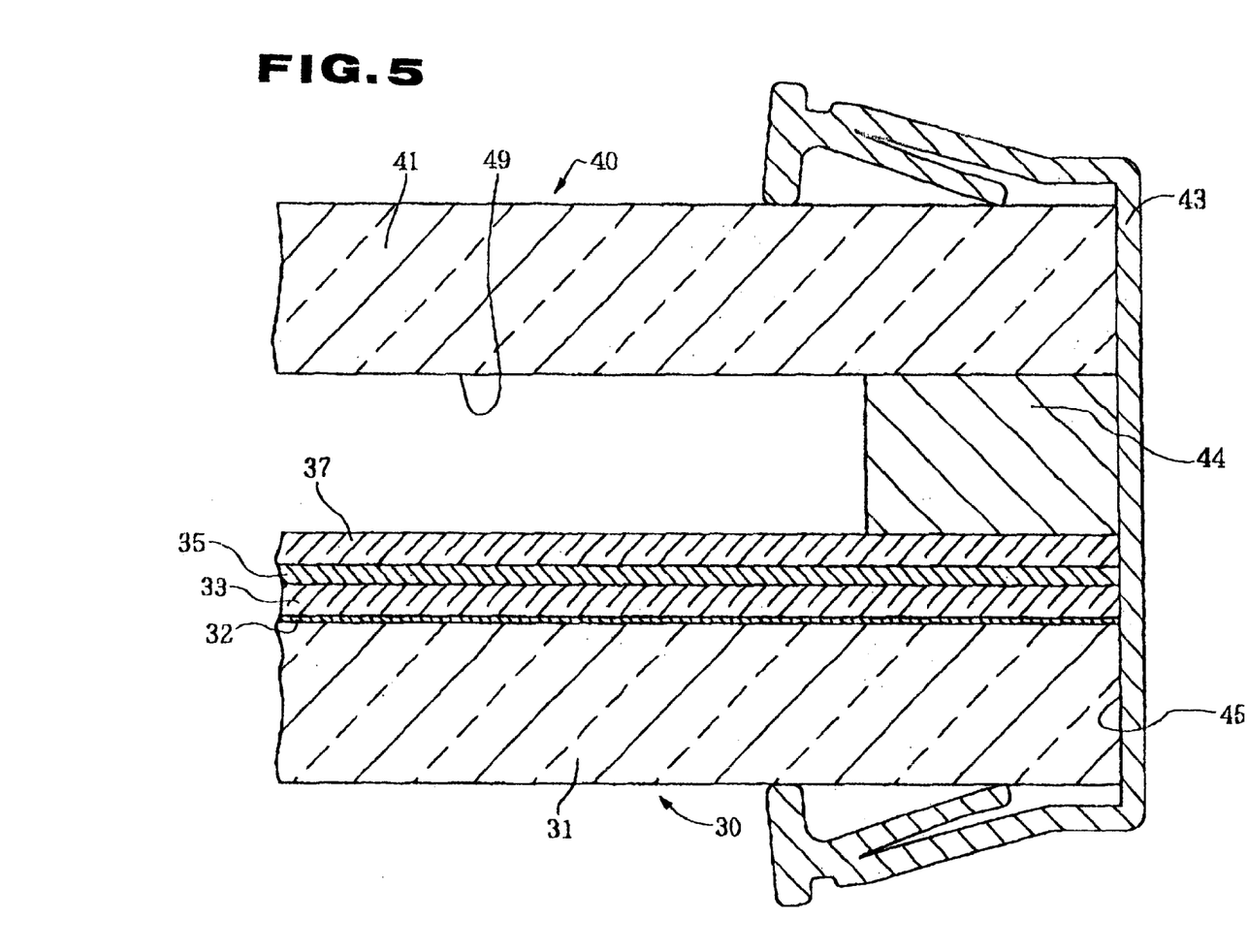
FIG. 5 is a fragmentary transverse cross-sectional view of a solar-shading double-layer glass panel (sealed insulating glass or multiple glazing) which employs a solar-shading glass panel shown in FIG. 4.

As shown in FIG. 5, a solar-shading double-layer glass panel 40 according to the present invention comprises the solar-shalding glass panel 30 shown in FIG. 4, a second transparent glass sheet 41, a glazing channel 43 of synthetic resin, metal, or rubber, which has a substantially open-box cross-sectional shape, and a spacer 44 of aluminum, which has a block-shaped cross section. The glazing channel 43 has a mounting groove 45 in which edges of the solar-shading glass panel 30, the spacer 44, and the second transparent glass sheet 41 are fitted in position. The second transparent glass sheet 41 is spaced from the solar-shading glass panel 30 by a distance of 6 mm, for example, and extends substantially parallel to the solar-shading glass panel 30. The absorbing layer 32, the first transparent dielectric layer 33, the Ag-rich layer 35, and the second transparent dielectric layer 37 are interposed between the transparent glass sheet 31 and the second transparent glass sheet 41. A dry air layer 49 is present between the solar-shading glass panel 30 and the second transparent glass sheet 41. However, the dry air layer 49 may be replaced with a vacuum layer or a transparent resin film. If the dry air layer 49 is replaced with a transparent resin film, then since the transparent resin film bonds the solar-shading glass panel 30 and the second transparent glass sheet 41 to each other, the solar-shading double-layer glass panel 40 becomes a laminated glass panel, so that the glazing channel 43 and the spacer 44 may be dispensed with. The transparent resin film may be made of at least one material selected from the group consisting of polyvinyl alcohol such as polyvinyl butyral, vinyl acetate resin such as ethylene vinyl acetate, thermoplastic polyurethane, and polyvinyl chloride.

Inventive Examples and Comparative Examples of the solar-shading glass panel 30 shown in FIG. 4 and a process of manufacturing the solar-shading glass panel 30 will be described below.

INVENTIVE EXAMPLE 1

Using an in-line sputtering apparatus having a preliminary evacuating chamber and a sputtering chamber, a solar-shading layer which comprises the absorbing layer 32, the first transparent dielectric layer 33, the Ag-rich layer 35, and the second transparent dielectric layer 37 was grown on the transparent glass sheet 31 as follows:

Five cathodes were prepared in the sputtering chamber, and metal targets of Ti, Si, Ag, Zn, and Sn were set on the respective cathodes. The sputtering chamber was then evacuated to a pressure of $5 \times 10^{-4}$ Pa (Pascal) or less by a rotary pump and a cryopump. Then, the glass sheet 31 made of colorless, transparent float glass and having a thickness of 6 mm was cleaned, and then placed in the preliminary evacuating chamber, which was evacuated to 0.3 Pa or less. Then, the glass sheet 31 was transferred into the sputtering chamber.

Then, a $N_2$ gas was introduced at 100 SCCM (Standard Cubic CC/Minute) into the sputtering chamber to adjust the pressure in the sputtering chamber to 0.3 Pa. The cathode on which the target of Ti was set was supplied with a current from a DC power supply to cause an electric discharge, and the current was adjusted to 3 A (Amperes) at a voltage of about 450 V. The glass sheet 31 was passed over the target of Ti thereby to form the absorbing layer 32 which comprised a film of titanium nitride (TiN) having a thickness of 4 nm, on the glass sheet 31. Then, the cathode on which the target of Si was set was supplied with a current from the DC power supply to cause an electric discharge under the same condition as with the target Ti. The glass sheet 31 was passed over the target of Si thereby to form the first transparent dielectric layer 33 which comprised a film of silicon nitride ($Si_3N_4$) having a thickness of 52 nm, on the glass sheet 31.

Thereafter, the sputtering chamber was evacuated again to the pressure of $5 \times 10^{-4}$ Pa, and an Ar gas was introduced at 100 SCCM into the sputtering chamber to adjust the pressure in the sputtering chamber to 0.3 Pa. The cathode on which the target of Ag was set was supplied with a current from the DC power supply to cause an electric discharge under the same condition as with the target Ti. The glass sheet 31 was passed over the target of Ag thereby to form the Ag-rich layer 35 which comprised a film of Ag having a thickness of 10 nm, on the glass sheet 31. Then, the cathode on which the target of Zn was set was supplied with a current from the DC power supply to cause an electric discharge under the same condition as with the target Ti. The glass sheet 31 was passed over the target of Zn thereby to form an inner layer of the second transparent dielectric layer 37 which comprised a film of zinc having a thickness of 1nm, on the glass sheet 31. The thin inner layer of the second transparent dielectric layer 37 which had a thickness of 1nm was formed to prevent the surface of the Ag-rich layer 35 from being oxidized when an intermediate layer of second transparent dielectric layer 37 in the form of a zinc oxide film was subsequently formed. Further, the very thin metal zinc film is oxidized by itself to substantially form a zinc oxide film when the zinc oxide film as the intermediate layer of the second transparent layer 37 is subsequently formed. The resultant zinc oxide film of the metal zinc film, then is incorporated into the intermediate layer of the second transparent dielectric layer 37 in the form of the zinc oxide film.

Thereafter, the sputtering chamber was evacuated again to the pressure of $5 \times 10^{-4}$ Pa, and an $O_2$ gas was introduced at 100 SCCM into the sputtering chamber to adjust the pressure in the sputtering chamber to 0.3 Pa. The cathode on which the target of Zn was set was supplied with a current from the DC power supply to cause an electric discharge under the same condition as with the target Ti. The glass sheet 31 was passed over the target of Zn thereby to form an intermediate layer of the second transparent dielectric layer 37 which comprised a film of zinc oxide (ZnO) having a thickness of 5 nm, on the glass sheet 31. Then, the cathode on which the target of Sn was set was supplied with a current from the DC power supply to cause an electric discharge under the same condition as with the target Ti. The glass sheet 31 was passed over the target of Sn thereby to form an outer layer of the second transparent dielectric layer 37 which comprised a film of tin oxide ($SnO_2$) having a thickness of 10 nm, on the glass sheet 31.

Details of the solar-shading glass panel 30 according to Inventive Example 1 are set forth in Table 1 shown below. The transmission spectrum of the solar-shading glass panel 30, the reflection spectrum of the coated surface of the solar-shading glass panel 30, i.e., the surface thereof which is coated with the solar-shading layer, and the reflection spectrum of the uncoated surface of the solar-shading glass panel 30, i.e., the surface thereof which is not coated with the solar-shading layer were measured using a spectrophotometer. The measured results were applied to JIS R 3106-1985 (the method of testing the transmittance, reflectance, and solar radiation heat acquisition rate of a sheet glass according to Japan Industrial Standards) to calculate the visible light transmittance of the solar-shading glass panel 30, the visible light transmittance of the uncoated surface thereof, and the solar radiation transmittance of the solar-shading glass panel 30. The calculated results are set forth in Table 2 shown below. The visible light transmittance and the solar radiation transmittance are in accordance with the definitions given by JIS R 3106-1985. The selective transmission performance value in Table 2 indicate the selective transmission performance of the solar-shading glass panel 30, and is defined according to the following equation:

Selective transmission performance value=Solar radiation transmittance visible light transmittance The coated surface of the solar-shading glass panel 30 was also measured for its infrared reflection characteristics, and the measured values were applied to JIS R 3106-1985 to calculate the reflectance.

The double-layer glass panel 40 shown in FIG. 2 was produced with the solar-shading glass panel 30, whose transmission spectrum, coated-surface reflection spectrum, uncoated-surface reflection spectrum, and reflectance were measured, used as an outer glass panel with the coated surface facing indoors. The second glass sheet 41 comprising a colorless transparent float glass sheet having a thickness of 6 mm was placed as an indoor glass sheet, with the dry air layer 49, which was 6 mm thick, being interposed between the solar-shading glass panel 30 and the second glass sheet 41. The visible light transmittance, the outdoor-surface visible light reflectance, and the solar radiation heat acquisition rate of the double-layer glass panel 40 were calculated. The calculated results are set forth in Table 3 shown below. In FIG. 5, the upper surface of the second glass sheet 41 faces indoors, and the lower surface of the solar-shading glass panel 30 faces indoors.

TABLE 1

| | glass sheet | 1st film | 2nd film | 3rd film | 4th film | 5th film | 6th film | 7th film |
|---|---|---|---|---|---|---|---|---|
| | | | | | Film structure | | | |
| | | | | In. Ex. | | | | |
| 1 | 6 mm FL | TiN 4 nm | $Si_3N_4$ 52 nm | Ag 10 nm | ZnO / $SnO_2$ 5 nm 10 nm | | | |
| 2 | 6 mm FL | TiN 4 nm | $TiO_2$ 52 nm | Ag 16 nm | $TiO_2$ 25 nm | | | |
| 3 | 6 mm FL | TiN 10 nm | ZnO 64 nm | Ag 10 nm | ZnO 35 nm | | | |
| 4 | 6 mm FL | Cr 0.5 nm | ZnO 30 nm | Ag 16 nm | ZnO / $SnO_2$ 25 nm 25 nm | | | |
| 5 | 6 mm FL | TaN 5.8 nm | ZnO 31.7 nm | Ag 14.4 nm | ZnO / $SnO_2$ 10 nm 21.3 nm | | | |
| 6 | 6 mm FL | TiN 6 nm | $Si_3N_4$ 7 nm | Ag 12 nm | $Si_3N_4$ 55 nm | | | |
| 7 | 6 mm FL | TiN 1.4 nm | $TiO_2$ 36.2 nm | Ag 15.4 nm | $TiO_2$ 21.6 nm | | | |
| 8 | 6 mm FL | TiN 2.5 nm | $TiO_2$ 36.0 nm | Ag 16.1 nm | $TiO_2$ 22.1 nm | | | |
| 9 | 6 mm FL | Ti 3.3 nm | ZnO 58.1 nm | Ag 11.5 nm | ZnO 40.9 nm | | | |
| | | | | Co. Ex. | | | | |
| 1 | 6 mm FL | ZnO 26.3 nm | Ag 8.0 nm | ZnO 82.0 nm | Ag 13.4 nm | ZnO 35.1 nm | | |
| 2 | 6 mm FL | SS 6.0 nm | $TiO_2$ 10.0 nm | | | | | |
| 3 | 6 mm FL | ZnO 29 nm | Ag 9.5 nm | ZnO 73 nm | Ag 11.0 nm | ZnO 72 nm | Ag 12.5 nm | ZnO 34 nm |
| 4 | 6 mm FL | ZnO 15 nm | Ag 8.0 nm | ZnO 45 nm | | | | |

FL represents transparent float glass.
SS represents stainless steel.

TABLE 2

Single panel characteristics

| | A | B | C | D | E | F |
|---|---|---|---|---|---|---|
| | | | In. Ex. | | | |
| 1 | 56.4% | 10.6% | 38.4% | 0.68 | colorless | colorless |
| 2 | 62.8% | 15.9% | 38.7% | 0.62 | colorless | colorless |
| 3 | 54.6% | 11.2% | 33.4% | 0.61 | colorless | light green |
| 4 | 61.5% | 10.5% | 38.5% | 0.63 | colorless | light green |
| 5 | 58.6% | 12.5% | 40.0% | 0.68 | colorless | colorless |
| 6 | 56.8% | 16.5% | 39.0% | 0.69 | colorless | colorless |
| 7 | 71.6% | 9.8% | 45.0% | 0.63 | light green | colorless |
| 8 | 69.5% | 9.5% | 44.3% | 0.64 | light green | colorless |
| 9 | 50.2% | 7.4% | 32.7% | 0.65 | colorless | colorless |
| | | | Co. Ex. | | | |
| 1 | 77.5% | 5.8% | 42.5% | 0.55 | colorless | colorless |
| 2 | 31.9% | 12.6% | 28.4% | 0.89 | colorless | * |
| 3 | 71.5% | 5.0% | 33.9% | 0.47 | colorless | colorless |
| 4 | 83.6% | 8.1% | 62.8% | 0.75 | blue | colorless |

A: Visible light transmittance
B: Visible light reflectance (uncoated surface)
C: Solar radiation transmittance
D: Selective transmission performance value
E: Reflected color (uncoated surface)
F: Transmitted color
* described in the test.

TABLE 3

Double-layer glass characteristics

| | | Visible light transmittance | Visible light reflectance (outdoor) | Solar radiation heat acquisition ratio |
|---|---|---|---|---|
| In. Ex. | 1 | 50.4% | 13.1% | 0.42 |
| | 2 | 55.9% | 19.1% | 0.42 |
| | 3 | 48.2% | 13.6% | 0.39 |
| | 4 | 54.6% | 13.5% | 0.41 |
| | 5 | 52.4% | 15.2% | 0.43 |
| | 6 | 50.2% | 19.0% | 0.41 |
| | 7 | 63.7% | 14.0% | 0.47 |
| | 8 | 63.7% | 13.9% | 0.46 |
| | 9 | 44.4% | 9.4% | 0.38 |
| Co. Ex. | 1 | 68.5% | 10.6% | 0.44 |
| | 2 | 28.6% | 13.4% | 0.38 |
| | 3 | 63.0% | 9.1% | 0.36 |
| | 4 | 79.2% | 13.6% | 0.60 |

As can be seen from Table 3, the double-layer glass panel 40 according to Inventive Example 1 has a high visible light transmittance of 50.4%, allows an indoor occupant to see an outdoor scene naturally therethrough, and introduces sufficient indoor light. The double-layer glass panel 40 according to Inventive Example 1 has a colorless appearance as seen by an outdoor observer, and hence gives a clear impression on the outdoor observer. The double-layer glass panel 40 according to inventive Example 1 has a sufficiently low solar radiation acquisition ratio of 0.42, which is substantially equivalent to that of a similar double-layer glass panel with the known double-Ag LowE.

INVENTIVE EXAMPLES 2–9

Solar-shading glass panels 30 according to Inventive Examples 2–9 were produced in the same manner as with Inventive Example 1. The visible light transmittances of the solar-shading glass panels 30 according to Inventive Examples 2–9, the visible light reflectances of the uncoated surface thereof, and the solar radiation transmittances of the solar-shading glass panels 30 according to Inventive Examples 2–9 are set forth in Table 2. Similarly, the visible light transmittances, outdoor visible light reflectances, and solar radiation heat acquisition ratios of solar-shading double-layer glass panels 40 produced using the solar-shading glass panels 30 according to Inventive Examples 2–9 are set forth in Table 3.

As shown in Table 2, the visible light transmittances of the solar-shading glass panels 30 according to Inventive Examples 2–9 are higher than 50%, and the solar radiation transmittances thereof are equal to or less than 45%. Therefore, the visible light transmittances of these solar-shading glass panels 30 are higher than those of the conventional solar-reflecting glass panels, and the solar radiation transmittances thereof are as low as the glass panel with the double-Ag LowE. The solar-shading layer of each of the solar-shading glass panels 30 according to Inventive Examples 2–9. comprises a small number of four films, and hence the cost of forming those films may be relatively low.

As show in Table 3, the double-layer glass panels 40 according to Inventive Examples 2–9 have high visible light transmittances greater than 44%, allows an indoor occupant to see an outdoor scene naturally therethrough, and introduces sufficient indoor light. The double-layer glass panels 40 according to Inventive Examples 2–9 have colorless or light green appearances as seen by an outdoor observer, and hence give a clear impression on the outdoor observer. The double-layer glass panels 40 according to Inventive Examples 2–9 have sufficiently low solar radiation acquisition ratios equal to or less than 0.47, which are much lower than that of a similar solar-shading double-layer glass panel using a glass panel with the known single-Ag LowE.

Comparative Examples 1–4 for comparison with Inventive Examples 1–9 will be described below.

COMPARATIVE EXAMPLE 1

The thicknesses of films of a solar-shading glass panel according to Comparative Example 1 produced in the same manner as with Inventive Example 1 are set forth in Table 1. The visible light transmittance of the solar-shading glass panel according to Comparative Example 1, the visible light reflectance of the uncoated surface thereof, and the solar radiation transmittance of the solar-shading glass panel according to Comparative Example 1 are set forth in Table 2. Similarly, the visible light transmittance, outdoor visible light reflectance, and solar radiation heat acquisition ratio of a solar-shading double-layer glass panel produced using the solar-shading glass panel according to Comparative Example 1 are set forth in Table 3.

As shown in Table 2, the visible light transmittance of the solar-shading glass panel according to Comparative Example 1 is of a very high value of 77.5%, and the visible light reflectance of the uncoated surface thereof is of a low value of 5.8%. As shown in Table 3, the visible light transmittance of the double-layer glass panel according to Comparative Example 1 is of a high value of 68.5%. However, since the solar radiation heat acquisition ratio thereof is also of a high value of 0.44 which is higher than that of the conventional solar-reflecting glass panel, the heat-insulating capability of the double-layer glass panel according to Comparative Example 1 is poor. Furthermore, inasmuch as the solar-shading glass panel according to Comparative Example 1 has five films, the cost of forming those films is higher than the conventional solar-reflecting glass panel.

COMPARATIVE EXAMPLE 2

Using an in-line sputtering apparatus having a preliminary evacuating chamber and a sputtering chamber, an infrared-radiation reflecting film was formed on a transparent glass sheet as follows:

Two cathodes were prepared in the sputtering chamber, and targets of stainless steel and Ti were set on the respective cathodes. The sputtering chamber was then evacuated to a pressure of $5 \times 10^{-4}$ Pa or less by a rotary pump and a cryopump. Then, a glass sheet made of colorless, transparent float glass and having a thickness of 6 mm was cleaned, and then placed in the preliminary evacuating chamber, which was evacuated to 0.3 Pa or less. Then, the glass sheet was transferred into the sputtering chamber.

Then, an Ar gas was introduced at 50 SCCM into the sputtering chamber to adjust the pressure in the sputtering chamber to 0.3 Pa. The cathode on which the target of stainless steel was set was supplied with a current from a DC power supply to cause an electric discharge, and the current was adjusted to 3 A at a voltage of about 410 V. The glass sheet was passed over the target of stainless steel thereby to form a first layer of stainless steel having a thickness of 6.0 nm on the glass sheet.

Then, after sputtering chamber was evacuated again to a pressure of $5 \times 10^{-4}$ Pa, an $O_2$ gas was introduced at 50 SCCM into the sputtering chamber to adjust the pressure in the sputtering chamber to 0.3 Pa. The cathode on which the target of Ti was set was supplied with a current from the DC power supply to cause an electric discharge under the same condition as with the target of stainless steel. The glass sheet was passed over the target of Ti thereby to form a second layer of titanium oxide ($TiO_2$) having a thickness of 10.0 nm.

The thicknesses of layers of the solar-shading glass panel according to Comparative Example 2 are set forth in Table 1. The visible light transmittance of the solar-shading glass panel according to Comparative Example 2, the visible light reflectance of the uncoated surface thereof, and the solar radiation transmittance of the solar-shading glass panels according to Comparative Example 2 are set forth in Table 2. Similarly, the visible light transmittance, outdoor visible light reflectance, and solar radiation heat acquisition ratio of a solar-shading double-layer glass panel produced using the solar-shading glass panel according to Comparative Example 2 are set forth in Table 3.

As shown in Table 3, the solar-shading doublelayer glass panel according to Comparative Example 2 has a low solar radiation heat acquisition ratio of 0.38, and hence has an excellent solar-shading capability. However, its visible light transmittance has a low value of 28.6%. Therefore, if the solar-shading double-layer glass panel according to Comparative Example 2 is used as a window glass pane, then a room with the window glass pane is relatively dark during daytime, an indoor occupant sees a dark outdoor scene therethrough, and the double-layer glass panel as seen by an outdoor observer gives an unnatural impression.

COMPARATIVE EXAMPLES 3, 4

The thicknesses of films of solar-shading glass panels according to Comparative Examples 3 and 4 produced in the same manner as with Inventive Example 1 are set forth in Table 1. The visible light transmittances of the solar-shading glass panels according to Comparative Examples 3 and 4, the visible light reflectances of the uncoated surfaces thereof, and the solar radiation transmittances of the solar-shading glass panels according to Comparative Examples 3 and 4 are set forth in Table 2. Similarly, the visible light transmittances, outdoor visible light reflectances, and solar radiation heat acquisition ratios of solar-shading doublelayer glass panels produced using the solar-shading glass panels according to Comparative Examples 3 and 4 are set forth in Table 3.

As shown in Table 3, the solar-shading doublelayer glass panel according to Comparative Example 3 has a low solar radiation heat acquisition ratio of 0.36, which is substantially the same as that of the conventional solar-reflecting glass panel, and its visible light transmittance has a high value of 63.0%. Therefore, if the solar-shading double-layer glass panel according to Comparative Example 3 is used as a window glass pane, then it is effective to reduce the air-conditioning load, a room with the window glass pane is light, and the double-layer glass panel as seen by an outdoor observer gives a natural impression. However, because the solar-shading layer of the solar-shading glass panel according to Comparative Example 3 has seven films, the cost of forming those films is high as compared with its advantages, and the solar-shading glass panel according to Comparative Example 3 is not suitable for widespread use.

The solar-shading layer of the solar-shading glass panel according to Comparative Example 4 has three films, and the cost of forming those films is substantially equivalent to that of the solar-reflecting glass panel. Therefore, the solar-shading glass panel according to Comparative Example 4 is suitable for widespread use. However, the solar-shading glass panel according to Comparative Example 4 has a solar radiation heat acquisition ratio of 0.60, which is higher than the solar radiation heat acquisition ratios of the conventional solar-reflecting glass panel and the solar-shading glass panels according to Inventive Examples 1–9.

According to the present invention, the Ag-rich layer disposed between the first and second transparent dielectric layerss mainly passes visible light therethrough, and effectively reflects light at wave-lengths longer than the visible light wavelengths for thereby lowering the transmittance of the light at those longer wavelengths. Therefore, the solar-shading light-transmissive panel is given a selective transmittance capability for selectively transmitting only visible light, and has a high visible light transmittance and a high solar-shading capability.

Since the absorbing layer is present between the first transparent dielectric film and the light-transmissive sheet, the thickness of the absorbing layer can be adjusted to adjust the solar radiation transmittance for thereby allowing the solar-shading light-transmissive panel to have a higher solar-shading capability. The uncoated surface of the solar-shading light-transmissive panel is colorless or light green, giving a clear impression to an outdoor observer who sees the uncoated surface of the solar-shading light-transmissive panel.

It is known that a glass panel with the single-Ag LowE which comprises a first transparent dielectric layer, an Ag-rich layer, and a second transparent dielectric layer that are successively disposed on a transparent glass sheet has a visible light transmittance of about 84%, a solar radiation transmittance of about 63%, and a selective transmittance performance value of about 0.75, as indicated by Comparative Example 4 in Table 2. The inventor has found that a solar-shading glass panel including the above three films disposed on an absorbing layer on the transparent glass sheet has a good selective transmittance performance value of about 0.65, for example, as indicated by Inventive Examples 1–9 in Table 2, and also found that by adjusting the thickness of the absorbing layer to achieve a visible light transmittance of 50%, for example, the solar radiation transmittance can be set to about 0.33 (=50%×0.65), for example, and as a result, the solar-shading glass panel has a solar-shading capability substantially equivalent to or greater than that of the conventional double-Ag LowE and also has a relatively high visible light transmittance.

According to the present invention, therefore, the solar-shading glass panel may basically have a fourfilm layer formed on a light-transmissive sheet, though it has a high solar-shading capability and a high visible light transmittance which are equivalent to or greater than those of the convention double-Ag LowE. The cost of forming the films of the solar-shading glass panel is lower than that of the conventional double-Ag LowE, and is about the same as that of the conventional single-Ag LowE.

If the solar-shading double-layer light-transmissive panel is used as a window glass pane, then it can effectively suppress an indoor temperature increase due to solar radiation, hence can cut down on the cost of air-conditioning the room with the window glass pane, and can keep the room light during daytime in summer, and can also effectively suppress heat radiation out of the room and reduce the cost of heating the room in winter. Inasmuch as the solar-shading double-layer light-transmissive panel has an ornamentally excellent appearance (on the uncoated surface of the solar-shading light-transmissive panel) as viewed from outside of the room, the building incorporating the window glass pane provides an impressive appearance.

Although certain preferred embodiments of the present invention have been shown and described in detail, it should be understood that various changes and modifications may be made therein without departing from the scope of the appended claims.

What is claimed is:

1. A solar-shading light-transmissive panel comprising:

a light-transmissive sheet;

an absorbing layer disposed on said light-transmissive sheet;

a first transparent dielectric layer disposed on said absorbing layer;

an Ag-rich layer comprising Ag as a main component disposed on said first transparent dielectric layer; and a second transparent dielectric layer disposed on said Ag-rich layer;

wherein said absorbing layer comprises a film of metal nitride having a thickness ranging no less than 1 and less than 20 nm;

wherein said metal nitride comprises at least one material selected from the group consisting of titanium nitride, zirconium nitride, tantalum nitride, and chromium nitride.

2. A solar-shading multi-layer light-transmissive panel comprising:

a solar-shading light-transmissive panel according to claim 1; and at least one second light-transmissive sheet disposed in confronting relationship to said solar-shading light-transmissive panel;

said solar-shading light-transmissive panel and said at least one second light-transmissive sheet being fixed relatively to each other such that said absorbing layer, said first transparent dielectric layer, said Ag-rich layer, and said second transparent dielectric layer are interposed between the light-transmissive sheet of said solar-shading light-transmissive sheet of said solar-shading light-transmissive panel and said at least one second light-transmissive sheet;

wherein said at least one second light-transmissive sheet comprises one sheet and said solar-shading multi-layer comprises double-layer;

wherein said solar-shading light-transmissive panel and said second light-transmissive sheet are spaced from each other.

3. A solar-shading multi-layer light-transmissive panel comprising:

a solar-shading light-transmissive panel according to claim 1; and at least one second light-transmissive sheet disposed in confronting relationship to said solar-shading light-transmissive panel;

said solar-shading light-transmissive panel and said at least one second light-transmissive sheet being fixed relatively to each other such that said absorbing layer, said first transparent dielectric layer, said Ag-rich layer, and said second transparent dielectric layer are interposed between the light-transmissive sheet of said solar-shading light-transmissive sheet of said solar-shading light-transmissive panel and said at least one second light-transmissive sheet;

wherein said at least one second light-transmissive sheet comprises one sheet and said solar-shading multi-layer comprises double-layer;

wherein said solar-shading light-transmissive panel and said second light-transmissive sheet are bonded to each other by a transparent resin film disposed therebetween.

4. A solar-shading light-transmissive panel according to claim 1, wherein said Ag-rich layer has a thickness ranging from 5 to 20 nm.

5. A solar-shading light-transmissive panel according to claim 1, wherein said first transparent dielectric layer has a thickness ranging from 5 to 90 nm, and said second transparent dielectric layer has a thickness ranging from 10 to 90 nm.

6. A solar-shading light-transmissive panel according to claim 1, having a visible light transmittance ranging from 50 to 75% and a solar radiation transmittance ranging from 20 to 45%.

7. A solar-shading light-transmissive panel according to claim 1, wherein said light-transmissive sheet comprises a glass sheet which is transparent in at least a visible light range.

* * * * *